US011420164B2

(12) United States Patent
Abdelkader et al.

(10) Patent No.: US 11,420,164 B2
(45) Date of Patent: Aug. 23, 2022

(54) METHOD OF DEIONIZING SALINE WATER WITH A DIFFUSION BARRIER

(71) Applicant: King Fahd University of Petroleum and Minerals, Dhahran (SA)

(72) Inventors: Bassel Alaa Awad Abdelkader, Dhahran (SA); Mohamed A. Antar, Dhahran (SA); Zafarullah Khan, Dhahran (SA); Tahar Laoui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 46 days.

(21) Appl. No.: 15/908,922

(22) Filed: Mar. 1, 2018

(65) Prior Publication Data
US 2019/0270053 A1  Sep. 5, 2019

(51) Int. Cl.
*B01D 71/02* (2006.01)
*B01D 69/12* (2006.01)
*B01D 71/68* (2006.01)
*B01D 67/00* (2006.01)
*C02F 1/44* (2006.01)
*B01D 69/10* (2006.01)
*C02F 101/10* (2006.01)
*C02F 103/08* (2006.01)

(52) U.S. Cl.
CPC ....... *B01D 71/021* (2013.01); *B01D 67/0079* (2013.01); *B01D 67/0088* (2013.01); *B01D 69/105* (2013.01); *B01D 69/12* (2013.01); *B01D 71/68* (2013.01); *C02F 1/44* (2013.01); *C02F 2101/10* (2013.01); *C02F 2103/08* (2013.01); *C02F 2303/22* (2013.01)

(58) Field of Classification Search
None
See application file for complete search history.

(56) References Cited

U.S. PATENT DOCUMENTS

| 9,713,794 B2* | 7/2017 | Choi | B01D 53/228 |
| 2013/0015136 A1* | 1/2013 | Bennett | B82Y 30/00 |
| | | | 210/653 |

(Continued)

FOREIGN PATENT DOCUMENTS

| WO | 2014/152407 A1 | 9/2014 |
| WO | 2014/168629 A1 | 10/2014 |
| WO | 2015/089130 A1 | 6/2015 |

OTHER PUBLICATIONS

Paulina Cytarska, "Filtration properties of membranes with active graphene oxide layer", Desalination and Water Treatment, vol. 64, Feb. 2017, pp. 350-358.

(Continued)

*Primary Examiner* — David C Mellon
(74) *Attorney, Agent, or Firm* — Oblon, McClelland, Maier & Neustadt, L.L.P.

(57) ABSTRACT

A method of deionizing saline water by contacting the saline water with a diffusion barrier to remove at least a portion of divalent ions to form deionized water, in order to desalinate the deionized water without scale formation, and a method of fabricating the diffusion barrier. Various embodiments of the diffusion barrier, the method of fabricating thereof, and the method of deionizing the saline water are provided.

14 Claims, 12 Drawing Sheets

(56) References Cited

U.S. PATENT DOCUMENTS

| | | | |
|---|---|---|---|
| 2013/0180912 A1* | 7/2013 | Li | B32B 9/007 |
| | | | 210/500.21 |
| 2014/0120453 A1* | 5/2014 | Ajayan | C01B 32/23 |
| | | | 429/482 |
| 2016/0207798 A1 | 7/2016 | Mahurin et al. | |
| 2016/0280563 A1* | 9/2016 | Raveendran-Nair | |
| | | | B01J 20/28035 |
| 2016/0310908 A1* | 10/2016 | Yu | B01D 71/021 |
| 2017/0106342 A1* | 4/2017 | Raveendran-Nair | |
| | | | C01B 32/182 |
| 2017/0157570 A1 | 6/2017 | Chu et al. | |
| 2017/0174537 A1* | 6/2017 | Zheng | B01D 67/0044 |
| 2017/0312695 A1* | 11/2017 | Majumder | B01D 61/027 |
| 2018/0071684 A1* | 3/2018 | Nair | B01D 61/027 |
| 2018/0154316 A1* | 6/2018 | Nair | B01D 67/0041 |
| 2018/0193806 A1* | 7/2018 | Zheng | B01D 69/148 |

OTHER PUBLICATIONS

Hanaa M. Hegab, "Graphene oxide-assisted membranes: Fabrication and Potential application in desalination and water purification", vol. 484, 2015, pp. 95-106.

* cited by examiner

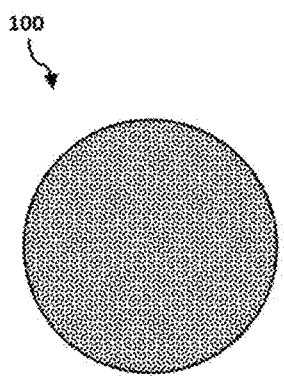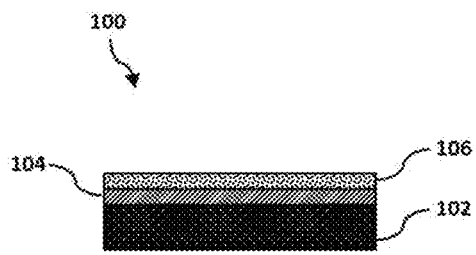
Fig. 1A
Fig. 1B

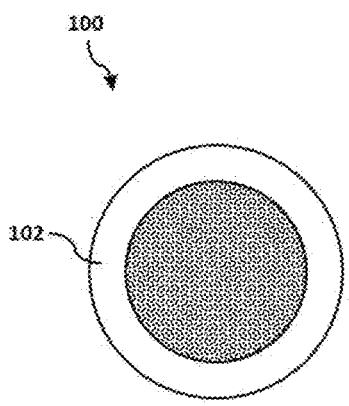
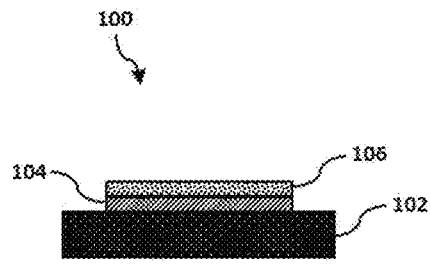
Fig. 1C
Fig. 1D

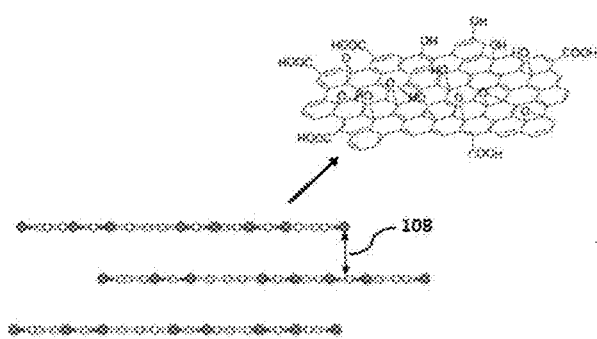
Fig. 2B
Fig. 2A
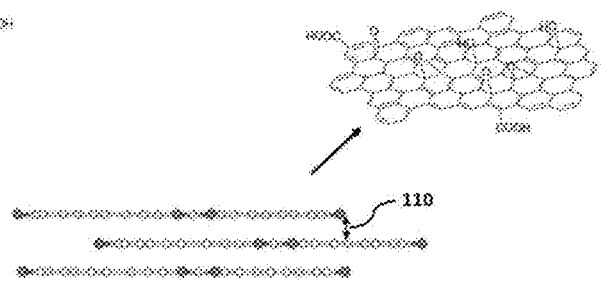
Fig. 2D
Fig. 2C

METHOD OF DEIONIZING SALINE WATER WITH A DIFFUSION BARRIER

BACKGROUND OF THE INVENTION

Technical Field

The present invention relates to a method of deionizing saline water by contacting the saline water with a diffusion barrier to remove at least a portion of divalent ions present in the saline water to form deionized water, and optionally further deionizing the deionized water by multistage flash distillation or multi-effect distillation.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mineral scale formation is an expensive problem in desalination systems. Scale formation on membrane or other heat transfer surfaces in contact with water supersaturated with a sulfate, e.g. calcium sulfate, creates technical problems including heat transfer hindrance, increased energy consumption, and equipment shutdown, and therefore increases the operation and maintenance cost of desalination.

To control scaling in desalination plants, several methods have been adopted. From the early stages of reverse osmosis desalination, acidification of water was one of the approaches considered to affect the deposition of carbonate and bicarbonate ions. However, acid treatment results in the corrosion of metallic surfaces of desalination units, e.g. multistage flash or multi effect units used to purify water.

Antiscalants were developed for scale inhibition on membranes used in desalination plants. They are used in small amounts having a minimal effect on the feed water quality and function by retarding the growth of mineral salt crystals [Alice Antony et al; Journal of Membrane Science 383 (2011) 1-16]. The choice of antiscalant depends on the degree of saturation, stability, and temperature. However, antiscalants have many drawbacks because they are environmental unfriendly due to their chemical effect on the treated water and the surrounding environment, in addition to the high cost of chemicals.

Therefore, there is an increasing demand for new approaches to prevent scale buildup in desalination processes that are environmentally friendly and economically feasible. One effective approach to prevent scale buildup in desalination processes and to increase the performance ratio and efficiency of desalination processes is through pretreating saline water to remove divalent ions, e.g. sulfate ions, before desalination. A pretreatment step to remove divalent ions can substantially reduce sulfate scale buildup on surfaces of desalination units, e.g. multistage flash or multi effect units that are used to desalinate water.

In view of the forgoing, one objective of the present disclosure relates to a method of deionizing saline water by contacting the saline water with a diffusion barrier, or passing the water through the diffusion barrier, to remove at least a portion of divalent ions to form deionized water. The deionized water may then be subjected to further deionization in order to effectively desalinate the deionized water without scale formation. Another objective of the present disclosure relates to a method of fabricating the diffusion barrier.

BRIEF SUMMARY OF THE INVENTION

According to a first aspect, the present disclosure relates to a method of deionizing saline water that contains one or more divalent ions, the method involves contacting the saline water with a diffusion barrier to remove at least a portion of the one or more divalent ions thereby forming deionized water, wherein the diffusion barrier includes a) a polymer substrate, b) an adhesive layer disposed on the polymer substrate, c) a graphene-containing layer disposed on the adhesive layer, wherein the graphene-containing layer comprises reduced graphene oxide with an interlayer spacing between atomic layers of 0.7 to 1.5 nm.

In one embodiment, an interlayer spacing between atomic layers of the reduced-graphene oxide is 0.75 to 0.85 nm.

In one embodiment, the graphene-containing layer further comprises graphene oxide with an interlayer spacing between atomic layers of 0.5 to 2.0 nm, wherein a volumetric ratio of the graphene oxide to the reduced graphene oxide is 1:2 to 1:100.

In one embodiment, the polymer substrate is at least one selected from the group consisting of a polyethersulfone, a polysulfone, a polyamide, a polyimide, a polyetherimide, a polyacrylonitrile, and a polyvinylidene fluoride.

In one embodiment, the adhesive layer comprises polyacrylamide.

In one embodiment, the method further involves desalinating the deionized water in a desalination unit.

In one embodiment, the desalinating is carried out at a temperature of 60 to 180° C. In one embodiment, the deionized water does not include an antiscalant.

In one embodiment, the one or more divalent ions are selected from the group consisting of $Ca^{2+}$, $Mg^{2+}$, $Fe^{2+}$, $Co^{2+}$, $Ba^{2+}$, $Zn^{2+}$, $Hg^{2+}$, $Pb^{2+}$, $Be^{2+}$, $Sn^{2+}$, $Sr^{2+}$, $Cu^{2+}$, $CO_3^{2-}$, $CrO_4^{2-}$, $SO_4^{2-}$, and $SO_3^{2-}$.

In one embodiment, a molar ratio of the one or more divalent ions in the deionized water to the one or more divalent ions in the saline water is in the range of 1:3 to 1:100.

In one embodiment, the one or more divalent ions are sulfate ions, wherein a molar ratio of the sulfate ions in the deionized water to the sulfate ions in the saline water is in the range of 1:3 to 1:100.

In one embodiment, the saline water is contacted with the diffusion barrier at a temperature of 10 to 100° C. and a pressure of 1 to 30 bars.

In one embodiment, the method further involves regenerating the diffusion barrier.

In one embodiment, the method further involves contacting the deionized water with the diffusion barrier to form double treated water, wherein a molar ratio of the one or more divalent ions in the double treated water to the one or more divalent ions in the saline water is in the range of 1:10 to 1:1,000.

According to a second aspect, the present disclosure relates to a method of fabricating the diffusion barrier, involving i) applying an adhesive layer onto a polymer substrate, ii) applying a graphene-containing layer comprising graphene oxide onto the adhesive layer, iii) treating the graphene-containing layer with hydrogen iodide to reduce at least a portion of the graphene oxide to reduced-graphene oxide, thereby fabricating the diffusion barrier.

In one embodiment, the hydrogen iodide is in a gaseous state.

In one embodiment, the hydrogen iodide is an aqueous hydrogen iodide solution with a mass concentration of 50 wt % to 70 wt %, relative to the total weight of the aqueous hydrogen iodide solution.

In one embodiment, a volumetric ratio of the graphene oxide to the reduced graphene oxide in the graphene-containing layer is 1:2 to 1:100.

In one embodiment, the adhesive layer is applied onto the polymer substrate by spin-coating an adhesive solution, and the graphene-containing layer is applied onto the adhesive layer by spin-coating a graphene oxide suspension.

In one embodiment, an interlayer spacing between atomic layers of the reduced-graphene oxide is in the range of 0.7 to 1.5 nm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A illustrates a top-view of a disc-shape diffusion barrier that includes a polymer substrate, an adhesive layer, and a graphene-containing layer, wherein the graphene-containing layer covers an entire surface of the polymer substrate.

FIG. 1B illustrates a side-view of the disc-shape diffusion barrier.

FIG. 1C illustrates a top-view of a disc-shape diffusion barrier that includes a polymer substrate, an adhesive layer, and a graphene-containing layer, wherein the graphene-containing layer partially covers a surface of the polymer substrate.

FIG. 1D illustrates a side-view of the disc-shape diffusion barrier.

FIG. 2A illustrates an interlayer spacing between atomic layers of graphene oxide.

FIG. 2B illustrates a constituent of an atomic layer of graphene oxide.

FIG. 2C illustrates an interlayer spacing between atomic layers of reduced graphene oxide.

FIG. 2D illustrates a constituent of an atomic layer of reduced graphene oxide.

DETAILED DESCRIPTION OF THE EMBODIMENTS

Figure 1E:
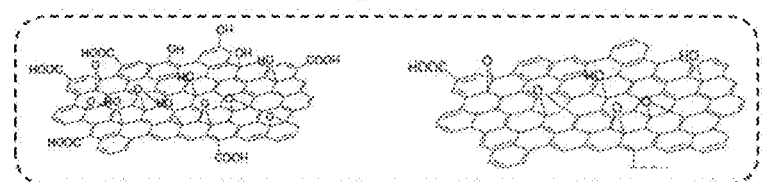
FIG. 1E represents constituents of an atomic layer of graphene oxide and reduced graphene oxide present in the graphene-containing layer.

Referring now to the drawings, wherein like reference numerals designate identical or corresponding parts throughout the several views.

According to a first aspect, the present disclosure relates to a method of deionizing saline water. The method involves contacting the saline water with a diffusion barrier 100 to remove at least a portion of divalent ions, present in the saline water, to form deionized water.

In terms of the present disclosure, the term "saline water" is used as a general term for any water than contains one or more organic or inorganic positively and/or negatively charged divalent ions preferably selected from the group consisting of $Ca^{2+}$, $Mg^{2+}$, $Fe^{2+}$, $Co^{2+}$, $Ba^{2+}$, $Zn^{2+}$, $Hg^{2+}$, $Pb^{2+}$, $Be^{2+}$, $Sn^{2+}$, $Sr^{2+}$, $Cu^{2+}$, $CO_3^{2-}$, $CrO_4^{2-}$, $SO_4^{2-}$, and $SO_3^{2-}$. The saline water may optionally contain one or more organic or inorganic positively and/or negatively charged mono- or poly-valent ions such as $Na^+$, $K^+$, $Al^+$, $Al^{3+}$, $Ag^+$, $Hg^+$, chloride, bicarbonate, iodide, nitrate, chlorate, acetate, fluoride, and nitrite. In addition, the saline water may contain one or more multivalent ions such as $Cr^{3+}$, $Co^{3+}$, $Fe^{3+}$, $Pb^{4+}$, $Ni^{4+}$, $Sn^{4+}$, citrate, etc. Ions present in the saline water may not be limited to the aforementioned ions, and various alternative ions may also be present in the saline water. The saline water may be brackish water, which may contain 0.05 wt % to 3 wt % of dissolved salts relative to the total weight of saline water, or seawater, which may contain from about 3.0 wt % to about 5.0 wt % of dissolved salts relative to the total weight of seawater. Alternatively, the saline water may be brine, which contains at least 5 wt % of dissolved salts relative to the total weight of brine.

The term "diffusion barrier" as used in this disclosure refers to a composite material having adjustable pore structures (i.e. interlayer spacing between atomic layers of graphene constituents) that may be used for separating ions, preferably divalent ions with a hydrated diameter of at least 0.7 nm, preferably 0.7 to 1.5 nm, more preferably 0.72 to 0.85 nm, from saline water. Since pore structures of the diffusion barrier of the present disclosure can be adjusted, the diffusion barrier may be utilized in various applications including nanofiltration, reverse osmosis (RO), forward osmosis (FO), pervaporation, etc. The diffusion barrier 100 may also be used for filtration of organic compounds from a liquid stream.

Referring to FIGS. 1B and 1D, the diffusion barrier 100 includes a polymer substrate 102, an adhesive layer 104 disposed on the polymer substrate, and a graphene-containing layer 106 disposed on the adhesive layer.

In some embodiments, the polymer substrate 102 may be made of natural and/or synthetic polymers within the scope of those skilled in the art, including, without limitation, polyolefins such as polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polyamides including nylon 6, nylon 66, and nylon 12, polycarbonates, polystyrenes, polynitriles such as polyacrylonitrile, polyacrylates such as polymethyl methacrylate, polyacetates such as polyvinyl acetate, polyalcohols such as polyvinyl alcohol, cellulose acetate, polysaccharides (such as chitosan, collagen, or gelatin), proteins such as chitin, hyaluronic acid, polyalkylene oxides such as polyethylene oxide and polyethylene glycol, polyurethanes, polyureas, polyvinyl chloride, polyimides, polyimines such as polyethylene imine, polyvinylpyrrolidone, polyacrylic acids, polymethacrylic acids, polysiloxanes such as polydimethylsiloxane, poly(ester-co-glycol) copolymers, poly(ether-co-amide) copolymers, crosslinked forms thereof, derivatives thereof, and copolymers thereof. In some embodiments, combinations or mixtures of polyacrylonitrile, polyethersulfone, polyvinylidenefluoride, crosslinked water soluble polymers, e.g., polyvinylalcohol, modified cellulose and modified chitosan may be utilized for preparation of the polymer substrate. The polymer substrate may preferably be disposed on top of a non-woven fabric support sheet. In some embodiments, the polymer substrate may be a stack of electrospun nanofibers that comprise one or more of the aforementioned natural and/or synthetic polymers, wherein the stack of electrospun nanofibers is disposed on top of a non-woven fabric support sheet. According to these embodiments, the polymer substrate may be fabricated using electro-spinning, electro-blowing, blowing-assisted electro-spinning, and/or solution blowing technologies, as known to those skilled in the art, to form the stack of electrospun nanofibers.

The polymer substrate 102 may optionally be porous with an average pore diameter from about 10 nm to about 200 μm, in some embodiments from about 50 nm to about 30 μm, in some embodiments from about 100 nm to about 10 μm, and in some preferred embodiments, from about 0.2 μm to about 1.0 μm. The polymer substrate may have various geometries, including disc-shape, rectangular, spherical, hollow spherical, semi-spherical, cylindrical, and hollow cylindrical, etc. As shown in FIGS. 1A-1D, in a preferred embodiment, the polymer substrate has disc-shape geometry with an average thickness ranging from 0.5 to 20 mm, preferably 1.0 to 15 mm, preferably 2.0 to 10 mm.

The adhesive layer 104 may preferably be utilized in the diffusion barrier to connect and/or immobilize the graphene-containing layer 106 onto the polymer substrate 102. In some embodiments, the graphene-containing layer 106 may be directly in contact and adhered to the polymer substrate 102, and thus the diffusion barrier does not include the adhesive layer. The adhesive layer 104 may preferably include at least one adhesive compound selected from the group consisting of acrylic, urethane, silicon, polyacrylamide, polyethylene oxide, epoxy, and vinyl ester. In one embodiment, the adhesive layer may include a polyethylene oxide-based polymer resin and/or an epoxy-based resin. Example embodiments of the adhesive compound are not limited thereto and various other adhesive compounds may alternatively be utilized. In a preferred embodiment, the adhesive layer 104 consists of polyacrylamide. The thickness of the adhesive layer 104 may vary from about 1 μm to about 500 μm, preferably from about 10 μm to about 300 μm, or preferably from about 30 μm to about 150 μm. The adhesive layer 104 may optionally be porous with an average pore diameter in the range of 10 nm to about 10 μm, in some embodiments from about 50 nm to about 1.0 μm, in some embodiments from about 100 nm to about 500 nm.

The graphene-containing layer 106 is an active layer of the diffusion barrier 100 that removes selected ions, preferably divalent ions, from saline water or other types of liquids. As shown in FIG. 1E, the graphene-containing layer 106 contains graphene oxide and reduced graphene oxide, and may further contain pristine graphene in addition to other materials such as a binder, e.g. an acrylic, a urethane, polyacrylamide, an epoxy, and/or a vinyl ester, etc., activated carbon, silica nanoparticles, and/or nanoparticles of metal elements such as zinc, lead, tin, indium, titanium, iron, gold, silver, ruthenium, rhenium, etc. In some preferred embodiments, the graphene oxide and the reduced graphene oxide are present in the graphene-containing layer 106 at a volume percent of 10% to 99%, preferably 20% to 95%, preferably 30% to 90%, relative to the total volume of the graphene-containing layer 106. Preferably, the graphene-containing layer 106 does not include pristine graphene. Accordingly, in some embodiments, a volumetric ratio of the graphene oxide to the reduced graphene oxide in the graphene-containing layer is 1:2 to 1:100, preferably 1:3 to 1:90, preferably 1:5 to 1:80. A volume concentration of pristine graphene, when present, may be no more than 5.0% by volume, preferably no more than 2.0% by volume, preferably no more than 1.0% by volume, relative to the total volume of the graphene-containing layer. Also, a volume concentration of a binder, e.g., an acrylic, a urethane, polyacrylamide, an epoxy, and/or a vinyl ester, when present, may be no more than 10.0% by volume, preferably no more than 5.0% by volume, preferably no more than 4.0% by volume, relative to the total volume of the graphene-containing layer.

The "pristine graphene" or "graphene" present in the graphene-containing layer preferably refers to polycyclic aromatic molecules each comprising a plurality of carbon atoms connected to each other by a covalent bond, wherein the plurality of carbon atoms may form a 6-membered ring as a repeating unit, or may further include 5-membered rings and/or 7-membered rings. The term "graphene" may refer to a single layer of covalently bonded carbon atoms having $sp^2$ hybridization with a thickness of about 0.3 nm to about 0.8 nm. The term "pristine graphene" or "graphene" may also refer to a plurality of stacked layers of graphene having less than 100 layers, preferably less than 50 layers, more preferably less than layers, with an interlayer spacing of about 0.2 nm to about 0.6 nm, or about 0.3 nm to about 0.5 nm. The graphene may have any of various structures, depending upon the content of 5-membered rings and/or 7-membered rings in the graphene. Each graphene layer may possess pores with an average diameter from about 0.1 nm to about 100 nm, or from about 0.5 nm to about 30 nm, or from about 1.0 nm to about 10 nm.

Graphene oxide (may also refer to as "GO" in this disclosure) is a material that contains a single layer or a plurality of stacked layers of graphene having oxygen functional groups (e.g. hydroxyl, epoxy, carbonyl, and/or carboxylic groups) bonded to graphene basal-planes, as shown in FIG. 2B. The graphene oxide may be obtained by methods known to those skilled in the art, e.g. exfoliation of graphite oxide, etc. The oxygen functional groups (e.g. hydroxyl, epoxy, carbonyl, and/or carboxylic groups) present in the graphene oxide may be present on an edge and/or on a surface of the graphene basal-planes, as a result of oxidation reactions. The graphene oxide may include a plurality of layers, for example, less than 100 layers, with a thickness from about 10 nm to about 1000 nm, preferably from about 20 nm to about 500 nm, preferably from about 30 nm to about 100 nm. In some embodiments, an interlayer spacing between atomic layers of the graphene oxide is in the range from about 0.5 nm to about 2.0 nm, or from about 0.7 nm to about 1.8 nm, or about from about 1.0 nm to about 1.5 nm. The graphene basal-planes include 6-membered rings, 5-membered rings and/or 7-membered rings of covalently bonded carbon atoms having $sp^2$ hybridization, with the oxygen functional groups (e.g. hydroxyl, epoxy, carbonyl, and/or carboxylic groups) covalently bonded thereto. The graphene oxide may preferably contain at least 85 wt %, preferably at least 90 wt %, preferably at least 95 wt %, preferably at least 98 wt % of carbon atoms relative to the weight of the graphene oxide. Also, the graphene oxide may preferably contain no more than 15 wt %, preferably no more than 10 wt %, preferably no more than 5 wt % of oxygen atoms, preferably no more than 2 wt % of oxygen atoms, preferably no more than 1 wt % of oxygen atoms, preferably no more than 0.5 wt % of oxygen atoms relative to the weight of the graphene oxide. In one embodiment, a surface concentration of the total oxygen functional groups (e.g. hydroxyl, epoxy, carbonyl, and/or carboxylic groups) that are covalently bonded to the graphene basal-planes may be in the range of 0.1 to 5.0 $\mu g/\mu m^2$ (weight of the oxygen functional groups in $\mu g$ per 1.0 $\mu m^2$ of the graphene basal-planes), preferably 0.2 to 4.0 $\mu g/\mu m^2$, preferably 0.3 to 3.0 $\mu g/\mu m^2$. FIG. 2B illustrates a constituent of an atomic layer of the graphene oxide.

As used in this disclosure, the term "reduced graphene oxide" (may also refer to as "rGO" in this disclosure) may refer to a material that contains a single layer or a plurality of stacked layers of graphene having oxygen functional groups (e.g. hydroxyl, epoxy, carbonyl, and/or carboxylic groups) bonded to graphene basal-planes, wherein a surface concentration of the oxygen functional groups in the reduced graphene oxide is no more than 60%, preferably no more than 50%, preferably no more than 40% relative to the surface concentration of the oxygen functional groups in the graphene oxide. In one embodiment, the surface concentration of the oxygen functional groups in the graphene oxide and the reduced graphene oxide may be determined using X-ray photoelectron spectroscopy (XPS). FIG. 2D illustrates a constituent of an atomic layer of the reduced graphene oxide.

Due to a difference in the surface concentration of the oxygen functional groups in the reduced graphene oxide relative to the same in the graphene oxide, an interlayer spacing between atomic layers in the reduced graphene oxide 110 (as shown in FIG. 2C) may be at least 20%, preferably at least 30%, preferably 35% to 90% lower than the interlayer spacing between atomic layers in the graphene oxide 108 (as shown in FIG. 2A). As used in this disclosure, the term "interlayer spacing" refers to a distance between atomic layers of graphene, graphene oxide, or reduced graphene oxide. The interlayer spacing may substantially affect an ion separation/removal process using the diffusion barrier 100, since a flow of permeate mainly takes place in 2D channels between graphene oxide layers. In view of that, the interlayer spacing between atomic layers of the graphene oxide may be adjusted preferably by reducing the graphene oxide. In one embodiment, the interlayer spacing between atomic layers of each of the graphene, the graphene oxide, and the reduced graphene oxide may be determined by XRD and through using Bragg's law, as known to those skilled in the art.

In some preferred embodiments, the interlayer spacing between atomic layers of the reduced graphene oxide present in the graphene-containing layer of the diffusion barrier may be adjusted to a value in the range of range of 0.75 to 1.5 nm, preferably 0.76 to 0.85 nm to remove divalent ions in the saline water. Accordingly, the diffusion barrier 100 may remove at least 60%, preferably at least 70%, preferably at least 80% of total divalent ions present in the saline water or any other liquid, such as $Ca^{2+}$, $Mg^{2+}$, $Fe^{2+}$, $Co^{2+}$, $Ba^{2+}$, $Zn^{2+}$, $Hg^{2+}$, $Pb^{2+}$, $Be^{2+}$, $Sn^{2+}$, $Sr^{2+}$, $Cu^{2+}$, $CO_3^{2-}$, $CrO_4^{2-}$, $SO_4^{2-}$, and $SO_3^{2-}$.

Other than the interlayer spacing between atomic layers of the graphene oxide and the reduced graphene oxide, the diffusion barrier 100 may include micro-pores (i.e. pores with an average pore diameter of less than 2 nm, preferably in the range of 4-12 Å, more preferably 5-10 Å, even more preferably 6-8 Å) with a micro-pore specific pore volume in the range of 0.001-0.015 $cm^3/g$, preferably 0.002-0.012 $cm^3/g$, more preferably 0.003-0.01 $cm^3/g$, and a micro-pore specific surface area in the range of 10-500 $m^2/g$, preferably 20-400 $m^2/g$, more preferably 30-300 $m^2/g$. The diffusion barrier 100 may further include meso-pores (i.e. pores with an average pore diameter in the range of 2-50 nm, preferably 5-20 nm) with a meso-pore specific pore volume in the range of 0.01-0.03 $cm^3/g$, preferably 0.015-0.025 $cm^3/g$, and a meso-pore specific surface area in the range of 10-100 $m^2/g$, preferably 20-50 $m^2/g$.

Depending on the geometry of the polymer substrate 102, the diffusion barrier 100 may have various shapes and geometries. For example, in one embodiment, the diffusion barrier 100 may have a flat geometry, e.g. a disc-shape geometry, with an average diameter of at least 10 mm, preferably at least 20 mm, preferably at least 30 mm.

Deionized water may preferably be produced when the saline water is contacted with the diffusion barrier 100. As used herein, the term "deionized water" may preferably refer to water that is substantially free from divalent ions, such as $Ca^{2+}$, $Mg^{2+}$, $Fe^{2+}$, $Co^{2+}$, $Ba^{2+}$, $Zn^{2+}$, $Hg^{2+}$, $Pb^{2+}$, $Be^{2+}$, $Sn^{2+}$, $Sr^{2+}$, $Cu^{2+}$, $CO_3^{2-}$, $CrO_4^{2-}$, $SO_4^{2-}$, and $SO_3^{2-}$, without limitation. In one embodiment, the deionized water may refer to water that is substantially free from monovalent ions, divalent ions, and/or multivalent ions. The term "substantially free" as used herein may refer to embodiments where a concentration of a selected species in a solution is less than 0.05 wt %, preferably less than 0.02 wt %, preferably less than 0.01 wt %, relative to the total weight of the solution. For example, the phrase "deionized water is substantially free from divalent ions" refers to an embodiment, where the concentration of divalent ions in the deionized water is less than 0.05 wt %, preferably less than 0.02 wt %, preferably less than 0.01 wt %, relative to the total weight of the deionized water.

In a preferred embodiment, a molar ratio of the divalent ions in the deionized water to the divalent ions in the saline water is in the range of 1:3 to 1:100, preferably 1:20 to 1:99, preferably 1:50 to 1:98. In view of that, the diffusion barrier may effectively remove a substantive portion of divalent ions present in the saline water. In another preferred embodiment, sulfate ions are present in the saline water, wherein a molar ratio of the sulfate ions in the deionized water to the sulfate ions in the saline water is in the range of 1:3 to 1:100, preferably 1:20 to 1:99, preferably 1:50 to 1:98.

Figure 6:
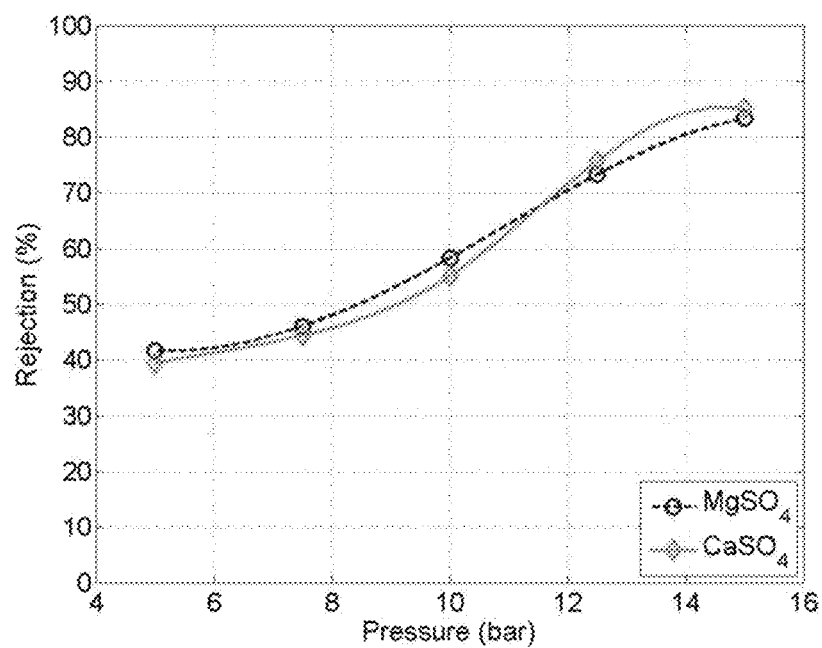
FIG. 6 represents the rejection of calcium sulfate and magnesium sulfate in a saline water stream at various pressures of the saline water stream.
Figure 7:
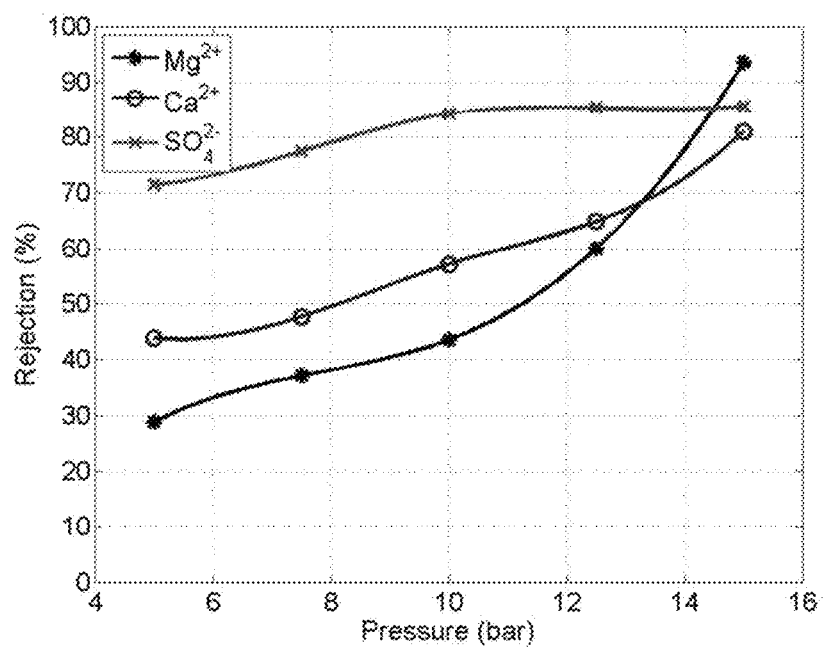
FIG. 7 represents the rejection of calcium, magnesium, and sulfate ions in a saline water stream, at various pressures of the saline water stream.

The term "contacting" as used in this disclosure may preferably refer to process whereby the saline water at an elevated pressure, for example, in a pressure of 1 to 40 bars, preferably 5 to 25 bars, is passed through the diffusion barrier 100, wherein the deionized water permeates through the diffusion barrier 100 and a portion of divalent ions present in the saline water is rejected. In some embodiments, the saline water may be contacted with the diffusion barrier 100 at conditions that are favored for removal of the divalent ions to take place. For example, in one embodiment, the saline water is contacted with the diffusion barrier at a temperature of 10 to 100° C., preferably 15 to 80° C., preferably 20 to 60° C., and a pressure in the range of 1 to 40 bars, preferably 2 to 28 bars, preferably 5 to 25 bars. For a given ion, a preferred water pressure for rejecting/removing the ion from water may be selected from rejection versus pressure curves, as shown in FIGS. 6 and 7. For example, in one embodiment, the saline water contains magnesium sulfate ($MgSO_4$), wherein the saline water is passed through the diffusion barrier at a pressure of 1 to 40 bars, preferably 10 to 20 bars, to separate at least 40%, preferably at least 65% of magnesium sulfate present in the saline water, as shown in FIG. 6. In another embodiment, the saline water contains $Mg^{2+}$, wherein the saline water is passed through the diffusion barrier at a pressure of at least 10 bars, preferably 12 to 20 bars, more preferably 13 to 16 bars to separate at least 40%, preferably at least 80%, preferably at least 90% of $Mg^{2+}$ present in the saline water, as shown in FIG. 7.

Alternative methods, as known to those skilled in the art, may be used to contact the saline water with the diffusion barrier, preferably with respect to a shape and an average particle size of the diffusion barrier. For example, in some embodiments, the diffusion barrier may have a disc-shape membrane structure, as shown in FIGS. 1A and 1C, which is secured inside a tube with a circular cross-section, wherein the saline water is passed through the disc-shape membrane structure at a pressure of at least 5 bars, preferably 8 to 30 bars, preferably 10 to 25 bars, thus leaving behind at least a portion of the divalent ions. In some alternative embodiments, an average particle size of the diffusion barrier is 1.0 to 20 mm, preferably 2.0 to 10 mm, wherein the diffusion barrier may be placed in a packed column and the saline water is passed through the diffusion barrier, preferably at a pressure of at least 5 bars, preferably 8 to 30 bars, preferably 10 to 25 bars. In some alternative embodiments, an average particle size of the diffusion barrier is less than 1.0 mm, preferably 0.1 to 1.0 mm, preferably 0.2 to 0.8 mm, wherein the diffusion barrier may first be mixed with the saline water to form heterogeneous slurry, and then the diffusion barrier may be filtered, leaving behind the deionized water.

A flux of the deionized water may vary from about 0.5 $g/cm^2/hr$ to about 50 $g/cm^2/hr$ (gram of deionized water produced in one hour per 1 $cm^2$ of an active surface of the diffusion barrier), preferably 1.0 $g/cm^2/hr$ to about 40 $g/cm^2/hr$, preferably 2.0 $g/cm^2/hr$ to about 30 $g/cm^2/hr$. In one embodiment, the diffusion barrier 100 may have an ion separation factor from about 80% to about 99.9%, preferably from about 95% to about 99%. In another embodiment, the diffusion barrier has a divalent ion separation factor from about 80% to about 99.9%, preferably from about 95% to about 99%. As used herein, the term "ion separation factor" may refers to a ratio (in percentile) of the total amount of ions (in mole) that are separated by the diffusion barrier to the total amount of ions that are initially present in the saline water before contacting with the diffusion barrier. Also, the term "divalent ion separation factor" may refer to a ratio (in percentile) of the total amount of divalent ions (in mole) that are separated by the diffusion barrier to the total amount of divalent ions that are initially present in the saline water before contacting with the diffusion barrier.

The deionized water may further be contacted with the diffusion barrier 100 for one or more subsequent cycles to form double/triple/multiple treated water. For example, in one embodiment, the deionized water is passed through the diffusion barrier to form double treated water at aforementioned conditions favored for removal of the divalent ions. Accordingly, a molar ratio of the divalent ions in the double treated water to the divalent ions in the saline water may be in the range of 1:10 to 1:1,000, preferably 1:80 to 1:900, preferably 1:100 to 1:800.

In one embodiment, the method involves regenerating the diffusion barrier 100. The diffusion barrier may be regenerated by i) increasing the interlayer spacing between atomic layers of the graphene oxide and/or the reduced graphene oxide present in the graphene-containing layer, ii) flowing a water stream to flush the divalent ions that may be trapped in the interlayer spacing between atomic layers of the graphene oxide and/or the reduced graphene oxide. In one embodiment, increasing the interlayer spacing between atomic layers of the graphene oxide and/or the reduced graphene oxide may be accomplished by sandwiching appropriate molecules therein, in order to increase or decrease the spacing as desired. In one embodiment, molecules with functional groups, such as borate, ethylenediamine, epichlorohydrin, phosphorus oxychloride (phosphoryl chloride), trimetaphosphate, linear mixed anhydrides of acetic and di- or tri-basic carboxlic acids, vinyl sulfone, diepoxides, cyanuric chloride, aldehydes (for example, formaldehyde, glutaraldehyde, acetaldehyde, acrolein), 1,4-butanediol diglycidyl ether, glyoxal, glyoxylic acid, oxydisuccinic acid, citric acid, fumaric acid, combinations thereof, and the like, may be placed between atomic layers of the graphene oxide and/or the reduced graphene oxide to form/destroy covalent bonds with the graphene oxide (or the reduced graphene oxide), thereby adjusting the interlayer spacing between atomic layers.

Once the saline water is deionized, the deionized water may be utilized in a desalination unit, e.g. a multistage flash desalination unit, or a multi-effect distillation, preferably without using an antiscalant. Accordingly, in a preferred embodiment, the method further involves desalinating the deionized water in a desalination unit to separate a portion of salt present in the deionized water, in order to form desalinated water.

Since the deionized water is preferably substantially free from divalent ions, the deionized water may preferably be desalinated at a temperature of 60 to 180° C., preferably 100 to 175° C., preferably 110 to 170° C., preferably 120 to 165° C. without forming scale in the desalination unit. In view of that, a performance ratio of the desalination unit may be increased by at least 20%, preferably by at least 50%, preferably by at least 80% when the deionized water is fed to the desalination unit in lieu of untreated water. As a result, an annual maintenance cost of desalination may be reduced by at least 20%, preferably at least 30%, preferably at least 50%. As used herein, the term "performance ratio" may refer to a ratio of an amount of desalinated water produced (in pounds) per 1,000 BTU of energy consumed.

In terms of the present disclosure, the term "scale" refers to various types of salts that may be precipitated inside evaporators, effects, stages, and/or vessels of the desalination units. The scale may preferably be a calcium scale and/or a sulfate scale, e.g. $CaCO_3$, $CaSO_4$, $MgCO_3$, and/or $MgSO_4$. However, other types of scale include calcium sulfate, barium sulfate, strontium sulfate, calcium phosphate, calcium fluoride, calcium silicate, magnesium hydroxide, zinc carbonate, and the like. It is also envisaged that desalinating the deionized water may be carried out at relatively higher temperatures (120 to 180° C., preferably 140 to 175° C., preferably 160 to 170° C.), and consequently higher performance ratios (due to a higher desalinated water production rate), without formation of scale.

In a preferred embodiment, the deionized water may preferably be desalinated without using an antiscalant. The term "antiscalant" or "scale inhibitor" may refer to any chemical agent that prevents, slows, minimizes, or stops the precipitation of scale from the saline water or the deionized water. In some embodiments, the deionized water may include with 1-10 ppm, preferably 2-9 ppm, more preferably 3-8 ppm of the antiscalant. Exemplary antiscalants include, but are not limited to sodium hexametaphosphate, sodium tripolyphosphate and other inorganic polyphosphates, hydroxy ethylidene diphosphonic acid, butane-tricarboxylic acid, phosphonates, or phosphonic acids such as amino tris(methylenephosphonic acid) (or ATMP), etc. carboxyl group-containing starting material acids, maleic acid, acrylic acid and itaconic acid and the like, polycarboxylic acid polymers, sulfonated polymers, vinyl sulfonic acid, allyl sulfonic acid, 3-allyloxy-2-hydroxy-propionic acid and other vinyl monomers having a sulfonic acid group, or a non-ionic acrylamide monomer from the vinyl copolymer, the Hydrex 4000 series antiscalants, e.g. Hydrex 4101, 4102, 4103, 4104, 4105, 4106, 4107, 4109, 4115, 4116, etc. as sold by Veolia Water Solutions and Technologies. For example, "Hydrex 4102" refers to an antiscalant made of a phosphonate blend that inhibits the formation of calcium carbonate scales. The phosphonate blend of Hydrex 4102 is a mixture of amino tris(methylenephosphonic acid) and phosphonic acid, with pH of about 11.00 to about 12.00.

According to a second aspect, the present disclosure relates to a method of fabricating the diffusion barrier 100. The method involves applying the adhesive layer 104 onto the polymer substrate 102 using methods known to those skilled in the art, for example, brushing, dip-coating, drop-coating, pouring, spin-coating, or spray-coating.

Figures 3A, 3B, 3C:
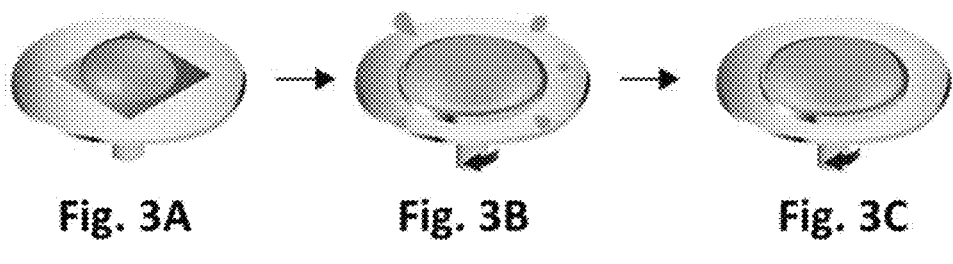
FIG. 3A illustrates a drop of an adhesive solution on a polymer substrate before spin-coating.
FIG. 3B illustrates spreading the adhesive solution on the polymer substrate during spin-coating.
FIG. 3C illustrates an adhesive layer deposited on the polymer substrate after spin-coating.

In a preferred embodiment, the adhesive layer is spin-coated onto the polymer substrate, as shown in FIGS. 3A-3C. Accordingly, an adhesive solution may be prepared by dissolving at least one adhesive compound such as polyacrylamide, acrylic, urethane, silicon, poly(ethylene oxide) or a poly(ethylene oxide)-based polymer resin, epoxy or an epoxy-based resin, vinyl ester, etc. in a water-based, water soluble or organic solvent, such as N,N-dimethyl formamide (DMF), tetrahydrofuran (THF), methylene chloride, dioxane, ethanol, propanol, butanol, chloroform, water, or combinations thereof. A concentration of the adhesive compound in the adhesive solution may be in the range of 1.0 wt % to 40 wt %, preferably 2.0 wt % to 30 wt %, preferably 3.0 wt % to 25 wt %, relative to the total weight of the adhesive solution. In some embodiments, a surfactant may be mixed with the adhesive solution to lower a surface tension of the adhesive solution, which may help stabilizing the adhesive solution during spin-coating, spray-coating, dip-coating, and the like. Exemplary surfactants may include, without limitation, octylphenoxypolyethoxy ethanol (commercially available as TRITON X-100™), sorbitan monolaurate, sorbitan sesquioleate, glycerol monostearate, polyoxyethylene, polyoxyethylene cetyl ether, dimethyl alkyl amines, methyl dialkyl amines, or combinations thereof. When utilized, the surfactant may be present in an amount ranging from about 0.001 wt % to about 10 wt %, preferably from about 0.05 wt % to about 5 wt %, preferably from about 0.1 wt % to about 2 wt %, relative to the total weight of the adhesive solution.

As shown in FIGS. 3A-3C, in one embodiment, at least one drop (about 1 ml, or preferably 0.5 ml to about 2 ml) of the adhesive solution may be placed on the polymer substrate, preferably at the center of the polymer substrate. The polymer substrate may be rotated using a spin coating device with a rotational speed of 100 to 400 rpm, preferably 150 to 250 rpm, preferably about 200 rpm, for 1 to 5 minutes, preferably about 2 minutes. In some preferred embodiments, the polymer substrate may further be rotated with a rotational speed of 1,500 to 5,000 rpm, preferably 2,000 to 4,000 rpm, preferably about 3,000 rpm, for 4 to 10 minutes, preferably 5 to 8 minutes, preferably about 6 minutes. Once the adhesive solution spreads on the polymer substrate, the aforementioned spin-coating steps may optionally be repeated multiple times, for example 3 to 5 times, to increase the thickness of the adhesive layer on the polymer substrate.

The method of fabricating the diffusion barrier further involves applying a graphene-containing layer 106 onto the optional adhesive layer 104 using methods known to those skilled in the art, for example, brushing, dip-coating, drop-coating, pouring, spin-coating, or spray-coating.

Figures 4A, 4B, 4C:
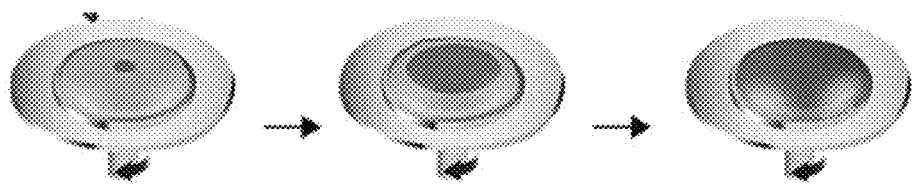
FIG. 4A illustrates a drop of a graphene-containing suspension on the adhesive layer before spin-coating.
FIG. 4B illustrates spreading the graphene-containing suspension on the adhesive layer during spin-coating.
FIG. 4C illustrates a graphene-containing layer deposited on the adhesive layer after spin-coating.

In a preferred embodiment, the graphene-containing layer is spin-coated onto the adhesive layer, as shown in FIGS. 4A-4C. Accordingly, a graphene oxide suspension may be prepared by mixing graphene oxide in water, preferably distilled water, or a solvent such as, ethylene glycol, dimethylformamide, n-methylpyrrolidone, tetrahydrofuran, or combinations thereof. The graphene oxide may be present in the graphene oxide suspension in any amounts ranging from about 0.01 mg/ml to about 1.0 mg/ml, preferably from about 0.05 mg/ml to about 0.8 mg/ml, preferably from about 0.1 mg/ml to about 0.5 mg/ml. In some embodiments, the graphene oxide suspension is roll-milled and/or sonicated for better dispersion of the graphene oxide in water or the solvent. Graphene oxide used in the graphene oxide suspension may be prepared using any of various existing methods, e.g. mechanical exfoliation, epitaxial growth, etc., and thus the graphene oxide may have various grain boundary structures. The graphene oxide suspension may also contain less than 10%, preferably less than 5% of pristine graphene relative to the total volume of the graphene oxide present in the graphene oxide suspension.

Once the graphene oxide suspension is prepared, at least one drop (about 1 ml, or preferably 0.5 ml to about 2 ml) of the graphene oxide suspension may be placed on the adhesive layer and rotated, preferably with the aforementioned spin-coating steps to form a graphene-containing layer onto the adhesive layer. These steps are shown in FIGS. 4A-4C. In some embodiments, at least 10 ml, or at least 50 ml, or at least 100 ml of the graphene oxide suspension may be placed on the adhesive layer and rotated. In some embodiments, the aforementioned spin-coating steps may optionally be repeated multiple times, for example 3 to 5 times, to increase the thickness of the graphene-containing layer on the adhesive layer. A centrifugal force provided by the spin-coating device and a quick evaporation of water or the solvent may facilitate an ordered assembly of the graphene oxide in the graphene-containing layer.

Figure 5A:
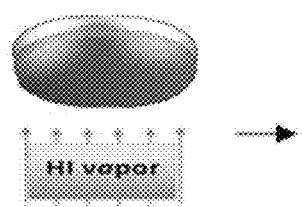
FIG. 5A illustrates exposing the graphene-containing layer to hydrogen iodide vapor to reduce the graphene oxide.
Figure 5B:
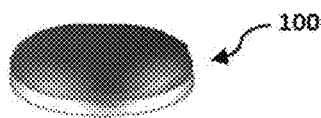
FIG. 5B illustrates the diffusion barrier.

Once the graphene-containing layer is applied onto the adhesive layer, the graphene oxide present in the graphene-containing layer is treated with hydrogen iodide (HI) to reduce at least a portion of the graphene oxide to reduced-graphene oxide, as shown in FIG. 5A. Hydrogen iodide is a reducing agent that may readily reduce a portion of the graphene oxide present in the graphene-containing layer.

Reducing the graphene oxide may remove a portion of oxygen functional groups (e.g. hydroxyl, epoxy, carbonyl, and/or carboxylic groups) bonded to graphene basal-planes and/or change the chemical functionality of the oxygen functional groups, e.g., from carbonyl to hydroxyl, from acid to alcohol and/or epoxide, etc. When the surface concentration of oxygen functional groups is reduced, the interlayer spacing between graphene basal-planes may subsequently reduce, due to existing interactions between graphene basal-planes, e.g. 7E-7E stacking interactions. The interlayer spacing between graphene basal-planes may be adjusted by varying the amount of time during which the graphene-containing layer is exposed to the hydrogen iodide as well as a temperature at which the graphene-containing layer is exposed to the hydrogen iodide. For example, in one embodiment, the hydrogen iodide is passed over the graphene-containing layer of the diffusion barrier at room temperature (i.e. a temperature of 20 to 30° C., preferably 22 to 28° C., preferably 24 to 26° C.) for 60 to 360 minutes, preferably 70 to 350 minutes, wherein the interlayer spacing between atomic layers of the reduced graphene oxide ranges from 0.7 to 1.5 nm, preferably 0.75 to 1.0 nm, preferably 0.76 to 0.85 nm. In another embodiment, the hydrogen iodide is passed over the graphene-containing layer of the diffusion barrier at a temperature of 40 to 80° C., preferably 45 to 55° C., for 1 to 60 minutes, preferably 2 to 55 minutes, wherein the interlayer spacing between atomic layers of the reduced graphene oxide ranges from 0.7 to 1.5 nm.

The hydrogen iodide may preferably be in a gaseous state, which may be passed over and/or through the graphene-containing layer of the diffusion barrier to reduce at least a portion of the graphene oxide to reduced-graphene oxide. However, in some embodiments, the hydrogen iodide is an aqueous hydrogen iodide solution with a mass concentration of 50 wt % to 70 wt %, preferably 55 wt % to 68 wt % relative to the total weight of the aqueous hydrogen iodide solution, wherein the graphene-containing layer of the diffusion barrier may be immersed into the aqueous hydrogen iodide solution for a sufficient time to reduce a portion of the graphene oxide. For example, in one embodiment, the graphene-containing layer is immersed into the aqueous hydrogen iodide solution, which has a concentration of 50 wt % to 70 wt %, at a temperature of 40 to 60° C., for 2 to 10 minutes, to form reduced graphene oxide in the graphene-containing layer.

Reducing the graphene oxide in the graphene-containing layer may preferably be conducted at a temperature of no more than 70° C., preferably no more than 60° C., preferably no more than 50° C., which is substantially lower than melting/decomposition temperatures of the polymer substrate and the adhesive layer, and therefore the method of fabricating the diffusion barrier as presented in this disclosure does not affect or degrade the diffusion barrier, and may prolong the life span and durability of the diffusion barrier.

Alternative methods may also be utilized to reduce the graphene oxide present in the graphene-containing layer, as known to those skilled in the art. For example, in one embodiment, the diffusion barrier is purged under a flow of hydrogen gas or a gaseous mixture of hydrogen and an inert gas, e.g. helium, argon, etc., at a temperature of 120 to 200° C., preferably 130 to 180° C., for less than 5 minutes, preferably less than 3 minutes to form reduced graphene oxide in the graphene-containing layer. In another embodiment, the graphene-containing layer may be exposed to hydrogen plasma for a sufficient time to form reduced graphene oxide.

The examples below are intended to further illustrate protocols for the method of fabricating the diffusion barrier and the method of deionizing the saline water with the diffusion barrier, and are not intended to limit the scope of the claims.

Example 1

The following examples illustrate protocols for synthesizing graphene oxide based membrane to reject divalent ion. Thin film composite membranes for rejecting ions in desalination systems generally made from polyamide. Polyamide does not contain well defined channels to effectively pass water and filter ions. However, a membrane having graphene oxide flakes can effectively pass water through interlayer spacing between atomic layers of the GO flakes.

Seawater has a salinity of around 36,000 ppm, and about 87% of the salinity contains monovalent ions, while the remaining 13% mostly contains divalent ions. In desalination processes, in order to increase the top brine temperature, all divalent ions (calcium, sulfate, magnesium) should preferably be removed from seawater to prevent scale formation. Hydrated diameters of these ions are presented in Table 1, where the smallest divalent ion (sulfate) is approximately 0.758 nm, and the largest monovalent ion (sodium) is around 0.716 nm.

TABLE 1

Hydrated diameter for different ions in seawater.

| Ion | $Ca^{2+}$ | $Mg^{2+}$ | $SO_4^{2-}$ | $Na^+$ | $K^+$ | $Cl^-$ |
|---|---|---|---|---|---|---|
| Hydrated Diameter [nm] | — | — | — | 0.716 | 0.602 | 0.582 |
| | 0.824 | 0.856 | — | 0.716 | 0.662 | 0.664 |
| | 0.824 | — | 0.758 | — | 0.662 | 0.664 |
| | 0.82 | 0.86 | — | 0.72 | 0.66 | 0.66 |
| | 0.824 | 0.856 | — | 0.716 | 0.662 | 0.664 |

Figure 1F:
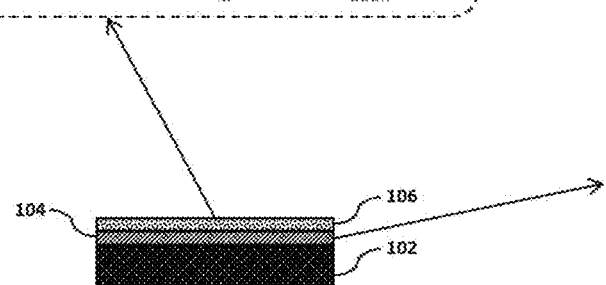
FIG. 1F represents an embodiment of the diffusion barrier wherein the adhesive layer contains polyacrylamide having the shown chemical structure.
Figure 1F:
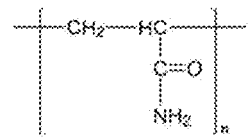
Figure 1G:
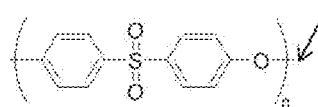
FIG. 1G represents an embodiment of the diffusion barrier wherein the polymer substrate contains polyethersulfone having the shown chemical structure.

The interlayer spacing between GO layers can be adjusted to selectively filter divalent ions while passing the monovalent ions. The interlayer spacing between GO layers was adjusted in the following steps. A polyethersulfone membrane with a diameter of 47 mm was washed by DI water and then secured in a spin coater. After that, 1 ml of a polyacrylamide solution was placed on the polyethersulfone membrane and rotated at a speed of 200 rpm for 2 mins. The polyethersulfone membrane was further rotated at a speed of 3000 rpm for 6 mins. It was then washed by 2 ml of DI water and placed on the spinner at 3000 rpm for 6 mins. PAM was used in the adhesive layer, because of the strong interaction between PAM and PES, i.e. the dipole-dipole forces between $CH_2$ and C=O groups in the PAM and S=O groups in the PES. The chemical structure of polyacrylamide (PAM) is shown in FIG. 1F, and the chemical structure of polyethersulfone (PES) is shown in FIG. 1G.

In the next step, 1 ml of a GO solution was deposited on the membrane at 200 rpm for 2 mins, followed by rotating at 3000 rpm for 6 mins. Table 2 and FIGS. 3A-3C, 4A-4C, and 5A-5B represent the procedure of coating. An interaction between COO⁻ groups in the GO layers and $NH_3^+$ groups in the PAM as well as the hydrogen bond between OH groups of the GO and $NH_3^+$ groups of the PAM provided a strong bonding between the GO and PAM.

TABLE 2

Procedure of developing GO/PAM-PES and rGO/PAM-PES

| Solutions | PAM | 0.2 gram PAM - 150 ml of DI water |
|---|---|---|
|  | GO | 0.15 mg/ml or 0.5 mg/ml |
| GO/PAM-PES membrane | Spin Coating | 200 rpm for 120 sec - 3000 rpm for 360 sec |
|  | Deposition | 1 ml PAM -> washing -> 1 ml GO |
| rGO/PAM-PES membrane |  | GO/PAM-PES membrane subjected to HI vapor |

Once the GO solution is spread on the polyethersulfone membrane, the graphene oxide is reduced by subjecting the GO membrane to hydrogen iodide (HI) vapor for a sufficient amount of time at a specific temperature. Accordingly, the size of the interlayer spacing was controlled in the reduced graphene oxide (rGO).

Figure 10:
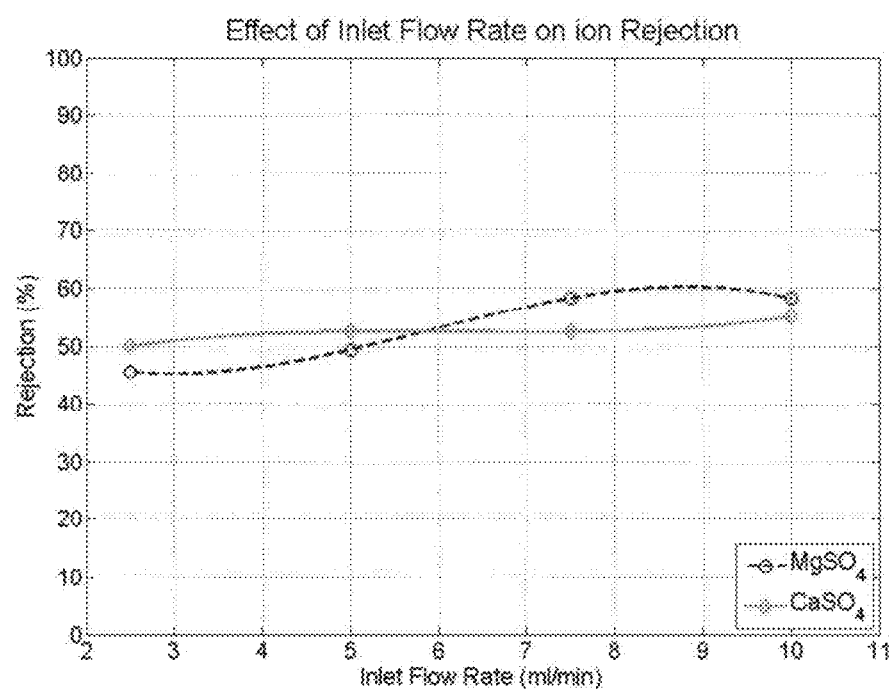
FIG. 10 represents the rejection of calcium sulfate ($CaSO_4$) and magnesium sulfate ($MgSO_4$) in a saline water stream, at various flow rates of the saline water stream.

Ion rejection capacity of the fabricated membrane was investigated with a cross-flow system. The cross-flow system consists of a test cell, a variable speed pump, a pressure gauge, and a relief valve to control the pressure. The membrane effective area of the cell was about 4.906 $cm^2$. The system was also equipped with a safety relief valve that was calibrated at 40 bars. An $MgSO_4$ solution, a $CaSO_4$ solution, and seawater were separately pumped through the system for one and half hour to reach steady state. The effect of pressure and the inlet flow rate of each solution on the ion rejection of the membrane and the permeate flux were studied. The ion rejection and permeate flux were measured at five different values of pressure starting at 5 bars with an increment of 2.5 bars, and four value of inlet flow rates starting at 2.5 ml/min with an increment of 2.5 ml/min. FIG. 10 individually represents the ion rejection of $MgSO_4$ and $CaSO_4$ solutions at various inlet flow rates. The ion/salt rejection for the $MgSO_4$ and $CaSO_4$ solutions were measured by a conductivity meter, while this quantity was measured by ICP-MS and IC for seawater. On the other hand, the permeate flux was calculated by dividing the measured output volume over time and membrane area.

It was observed that by increasing the operating pressure, the ion rejection was significantly increased. Pretreating seawater with rGO membranes resulted in a substantial increase in Mg rejection (more than 90%) and Ca rejection (around 82%) at 15 bars, which is significantly higher than Mg rejection and Ca rejection when treated with a polyamide membrane.

Figure 8:
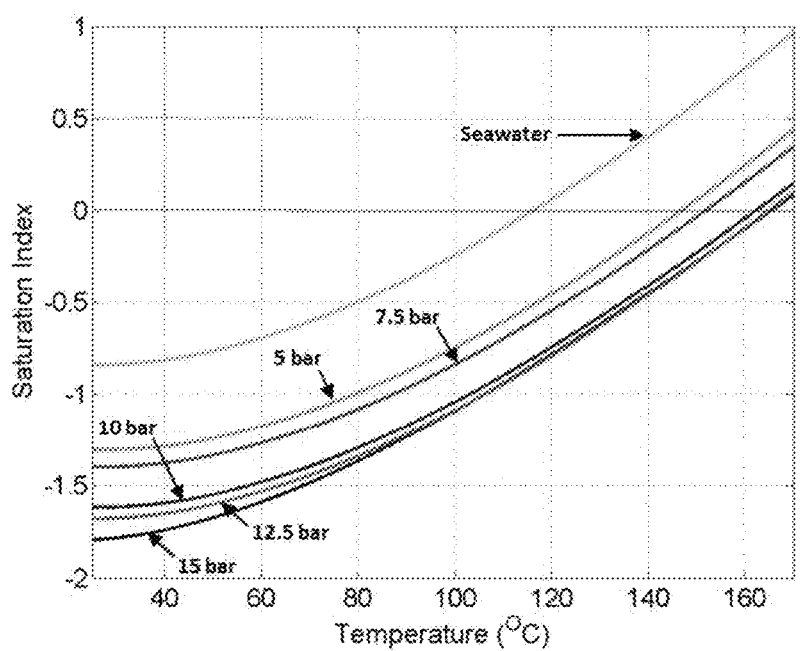
FIG. 8 represents saturation index curves of calcium sulfate in a saline water stream with respect to a temperature of the saline water stream, at various pressures of the saline water stream.
Figure 9:
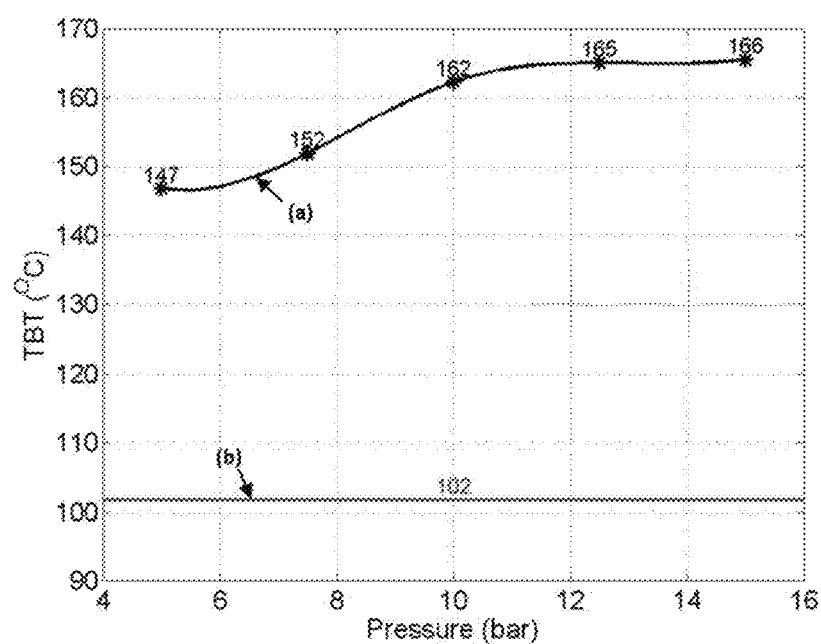
FIG. 9 represents a variation of top brine temperature in a multistage flash desalination unit at various pressures of a feed water stream, wherein the feed water stream is (a) deionized water treated with the diffusion barrier, (b) untreated seawater.

Using PHREEQC the saturation index of $CaSO_4$ in a water sample at various pressures were calculated after treatment with the rGO membranes, as shown in FIG. 8. Treating water with the rGO membrane eliminated most of the scaling species in the seawater which led to an increase in the top brine temperature during desalination, and thus enhanced the performance of the desalination. In a multi-stage flash desalination, the top brine temperature before treatment was measured to be around 102° C., without using antiscalant, while after treating water with the rGO membrane the top brine temperature was measured to be around 166° C., as shown in FIG. 9.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of deionizing saline water comprising one or more divalent ions, the method comprising:
    contacting the saline water with a diffusion barrier to remove at least a portion of the one or more divalent ions from the saline water thereby forming deionized water, wherein the diffusion barrier comprises
    a polymer substrate,
    an adhesive layer disposed on the polymer substrate, and
    a graphene-containing layer disposed on the adhesive layer, wherein the graphene-containing layer comprises reduced graphene oxide with an interlayer spacing between atomic layers of 0.7 to 1.5 nm.

2. The method of claim 1, wherein the interlayer spacing between atomic layers is 0.75 to 0.85 nm.

3. The method of claim 1,
    wherein the graphene-containing layer further comprises graphene oxide with an interlayer spacing between atomic layers of 0.5 to 2.0 nm, and
    wherein a volumetric ratio of the graphene oxide to the reduced graphene oxide is 1:2 to 1:100.

4. The method of claim 1, wherein the polymer substrate is at least one selected from the group consisting of a polyethersulfone, a polysulfone, a polyamide, a polyimide, a polyetherimide, a polyacrylonitrile, and a polyvinylidene fluoride.

5. The method of claim 1, wherein the adhesive layer comprises polyacrylamide.

6. The method of claim 1, further comprising:
    desalinating the deionized water in a desalination unit.

7. The method of claim 6, wherein the desalinating is carried out at a temperature of 60 to 180° C.

8. The method of claim 6, wherein the deionized water does not include an antiscalant.

9. The method of claim 1, wherein the one or more divalent ions are selected from the group consisting of $Ca^{2+}$, $Mg^{2+}$, $Fe^{2+}$, $CO^{2+}$, $Ba^{2+}$, $Zn^{2+}$, $Hg^{2+}$, $Pb^{2+}$, $Be^{2+}$, $Sn^{2+}$, $Sr^{2+}$, $Cu^{2+}$, $CO_3^{2-}$, $CrO_4^{2-}$, $SO_4^{2-}$, and $SO_3^{2-}$.

10. The method of claim 1, wherein a molar ratio of the one or more divalent ions in the deionized water to the one or more divalent ions in the saline water is in the range of 1:3 to 1:100.

11. The method of claim 1,
    wherein the one or more divalent ions are sulfate ions, and
    wherein a molar ratio of the sulfate ions in the deionized water to the sulfate ions in the saline water is in the range of 1:3 to 1:100.

12. The method of claim 1, wherein the saline water is contacted with the diffusion barrier at a temperature of 10 to 100° C. and a pressure of 1 to 30 bars.

13. The method of claim 1, further comprising:
    regenerating the diffusion barrier.

14. The method of claim 1, further comprising:
    contacting the deionized water with the diffusion barrier to form double treated water, wherein a molar ratio of the one or more divalent ions in the double treated water to the one or more divalent ions in the saline water is in the range of 1:10 to 1:1,000.

\* \* \* \* \*